United States Patent [19]
Flockenhaus et al.

[11] Patent Number: 4,828,806
[45] Date of Patent: May 9, 1989

[54] PROCESS FOR CLEANING AN EXHAUST GAS

[75] Inventors: Claus Flockenhaus, Essen; Karl H. Laue, Hattingen; Theo Sander; Erich Hackler, both of Essen; Blagoje Levkov, Wiesbaden; Daniel Grimm, Schlangenbad-Baerstadt; Hartmut Kainer, Wiesbaden; Hermann Stein, Taunusstein, all of Fed. Rep. of Germany

[73] Assignees: Didier Werke AG, Wiesbaden; Didier Engineering GmbH, Essen, both of Fed. Rep. of Germany

[21] Appl. No.: 127,609

[22] Filed: Nov. 30, 1987

Related U.S. Application Data

[63] Continuation of Ser. No. 938,519, Dec. 5, 1986, abandoned, which is a continuation of Ser. No. 768,418, Aug. 22, 1985, abandoned.

[30] Foreign Application Priority Data

Aug. 22, 1984 [DE] Fed. Rep. of Germany ....... 3430870

[51] Int. Cl.$^4$ ............................................. B01D 53/36
[52] U.S. Cl. .................. 423/213.5; 502/316; 423/239; 423/245.3
[58] Field of Search .............. 423/213.5, 239 A, 245 S

[56] References Cited

U.S. PATENT DOCUMENTS

| | | | |
|---|---|---|---|
| 4,025,604 | 5/1977 | Moriguchi et al. | 423/239 A |
| 4,044,102 | 8/1977 | Muraki et al. | 423/239 |
| 4,049,777 | 9/1977 | Divivier et al. | 423/239 |
| 4,221,768 | 9/1980 | Inoue et al. | 423/213.2 |
| 4,235,604 | 11/1980 | Wagener et al. | 48/197 |
| 4,259,312 | 3/1981 | Flockenhaus et al. | 423/659 |
| 4,448,895 | 5/1984 | Ono et al. | 502/304 |
| 4,503,162 | 3/1985 | Windawi et al. | 502/174 |
| 4,521,388 | 6/1985 | Samish et al. | 423/235 |

FOREIGN PATENT DOCUMENTS

| | | | |
|---|---|---|---|
| 0051156 | 10/1981 | European Pat. Off. | |
| 1259298 | 1/1968 | Fed. Rep. of Germany. | |
| 2512410 | 9/1976 | Fed. Rep. of Germany. | |
| 196730 | 11/1984 | Japan | 423/245 S |
| 7308383 | 12/1973 | Netherlands | 423/245 S |

OTHER PUBLICATIONS

The Chemical Analysis of Iron, A. A. Blair, J. B. Lippincott Company, 1888, p. 8.
A Comprehensive Treatise on Inorganic and Theoretical Chemistry, J. W. Mellor, Longmans, Green and Co., 1932, vol. XII, pp. 598–599.
"Katalysatoren zur Reinigung von Autoabgasen", Von Wolfgang Welgert, Edgar Koberstein and Eduard Lakatos, Chamiker-Zeitung, 97, Jahrgang (1973) Nr. 9, pp. 469–478.

Primary Examiner—John Doll
Assistant Examiner—Jeffrey E. Russel
Attorney, Agent, or Firm—Nils H. Ljungman

[57] ABSTRACT

In a process for cleaning a waste gas containing various pollutants, the exhaust gas with the pollutants is introduced directly into a reduction reactor. In the reactor, the pollutants are reduced by ammonia. The catalyst used is iron oxide material or a mixed oxide material of iron oxide and chromium oxide, or a mixture of the mixture material of the mixed oxide material and the iron oxide material.

3 Claims, 1 Drawing Sheet

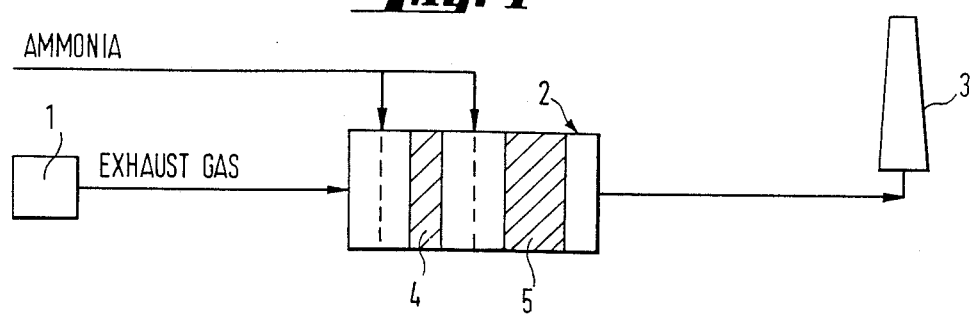
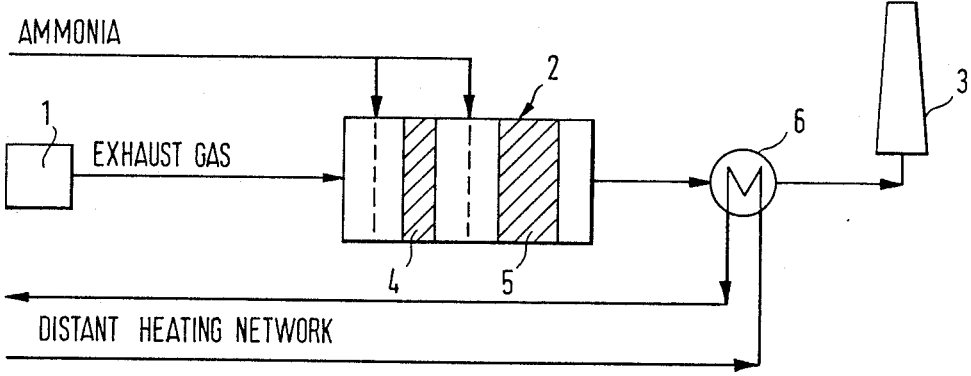
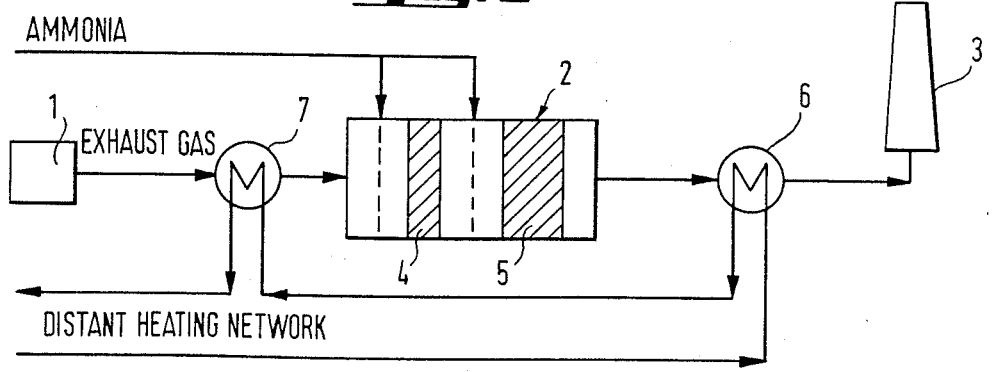

PROCESS FOR CLEANING AN EXHAUST GAS

This application is a continuation of U.S. application Ser. No. 938,519, filed on Dec. 5, 1986, now abandoned, which application is a continuation of U.S. application Ser. No. 768,418, filed on Aug. 22, 1985, now abandoned.

CROSS-REFERENCE TO CO-PENDING APPLICATIONS

Co-pending application Ser. No. 768,417 for filing on Aug. 22, 1985, entitled "Method And Apparatus For The Reactivation Of A Catalyst", now U.S. Pat. No. 4,656,148, and co-pending application Ser. No. 768,508 for filing on Aug. 22, 1985, entitled "Catalyst For Removal Of Nitrogen Oxides From Exhaust Gases", now U.S. Pat. No. 4,672,052, are both assigned to at least one of the same assignee as the instant application.

BACKGROUND OF THE INVENTION

1. Field of the Invention:

The invention relates to a process for cleaning an exhaust gas containing a pollutant, such as formaldehyde, carbon monoxide, nitrogen oxide, hydrocarbons and hydrogen cyanide, from a combustion apparatus, such as an internal combustion engine or furnace, which is operated with liquid or gaseous fuel.

2. Description of the Prior Art:

Selective catalyst processes, so-called Selective Catalytic Reduction (SCR) processes, are known, in which ammonia is used as a reduction agent, and in which a catalyst is used to reduce an $No_x$ (oxides of nitrogen). These processes are based on so-called "clean" exhaust gases. Such "clean" exhaust gases are formed in chemical plants, for example, nitric acid plants or adipic acid plants. But, if so-called smoke gases containing pollutants are present, SCR processes cannot be used without modification. Before reduction, the smoke gases must be cleaned by washing or by another method, for example, by filtering. An example of an SCR process is described in U.S. Pat. No. 4,521,388.

Some examples of catalytic technology are found in U.S. Pat. No. 4,259,312, entitled "Process And Apparatus For Catalytically Reacting A Reducing Gas and Water Vapor"; U.S. Pat. No. 4,235,604, entitled "Method For Processing Coke Oven Gas"; and U.S. Pat. No. 4,049,777, entitled "Method of Waste Gas Treatment", all of which are assigned to at least one of the same assignees of the instant application.

Further examples of catalytic technology are found in U.S. Pat. No. 4,448,895, entitled "Process For Preparation of Catalyst For Cleaning Exhaust Gases and Catalyst Prepared For The Process"; U.S. Pat. No. 4,503,162, entitled "Catalyst Systems For The Conversion Of Gases"; and U.S. Pat. No. 4,044,102, entitled "Method For Treating Exhaust Gases". All of the abovecited patents are incorporated herein by reference.

OBJECT OF THE INVENTION

The object of the invention, therefore, is to provide a process for the cleaning of a waste gas by conducting the waste gas, from which pollutants have not been previously removed, directly to a reactor.

SUMMARY OF THE INVENTION

The invention achieves this objective by conducting the exhaust gas with the pollutants to a reactor, which contains a catalyst, and wherein the pollutants are reduced by means of ammonia. The catalyst used is an iron oxide, or a mixed oxide of iron oxide and chromium oxide, or a mixture of the mixed oxide and the iron oxide, based on natural substances such as iron ores and ores containing chromium, which ores have a coarse structure, for example, lump ores or coarse ores. In the reactor, formaldehyde, carbon monoxide, nitrogen oxide, hydrocarbons and hydrogen cyanide are reduced together.

An advantage of the process is that minor contaminants in the exhaust, such as sulfur compounds unburned fuel, lubricants or soot, do not poison the catalyst and do not lead to its becoming stopped up by deposits.

In an embodiment of the invention, the quantity of chromium oxide addition is adjusted to the desired reduction temperature, preferably between 250° C. and 450° C.

The process described can be used, for example, for the cleaning of the exhaust from a gasoline internal combustion engine, a diesel engine or a LPG burner.

BRIEF DESCRIPTION OF THE DRAWINGS

Other advantages embodiments of the invention are illustrated in the accompanying drawings, in which:

FIG. 1 shows an installation for cleaning exhaust gas;

FIG. 2 shows a second installation for cleaning exhaust gas with utilization of the waste heat; and FIG. 3 shows a third installation for cleaning exhaust gas, with utilization of the waste heat and pre-cooling of the exhaust gas.

DESCRIPTION OF THE PREFERRED EMBODIMENTS

Referring now to FIGS. 1-3, the exhaust gas from a combustion installation 1 is conducted directly to a reactor 2. The reactor 2 is connected to a chimney 3. The reactor 2 comprises two catalyst beds 4 and 5. Ahead of each of the catalyst beds 4 and 5, ammonia is introduced into the reactor 2.

The catalyst in the beds 4 and 5 is a mixed oxide comprising naturally-occurring substances, such as lump ores or coarse ores, with approximately the following composition:

85 percent Fe (III) Iron Oxide
10 percent Cr (III) Chromium Oxide
2 percent Cr (VI) Chromium Oxide as well as admixtures of silicic acid, alkalis and earth alkalis.

The catalyst used can be an iron oxide catalyst, comprising naturally-occurring substances such as lump ores or coarse ores, with the following composition:

85 to 90 percent $Fe_2O_3$ (Iron Oxide);
3 to 4 percent $Fe_3O_4$ (Iron Oxide);
0.5 to 1.5 percent MnO (Manganese Oxide); and
4 to 5 percent $SiO_2$ (Silicon Dioxide), as well as traces of other alkali and earth alkali compounds. The percentage above are preferably percents by weight.

The catalyst can also be one which comprises a mixture of the two catalysts noted above.

The admixture of (III) chromium oxide is done at the desired reduction temperature, which is between 250°

C. and 450° C. 12% $Cr_2O_3$ is used for a desired reduction temperature of 280° C., and 6% $Cr_2O_3$ is used for a reduction temperature of 365° C., while 0.03% $Cr_2O_3$ is used for a reduction temperature of 450° C. The maximum cavity of the catalyst can thereby be set correspondingly. The percentages above are preferably percents by weight.

In the example, the exhaust gases with the following composition were conducted from the combustion apparatus 1 to the reactor 2:

70 to 77 percent by volume $N_2$ (Nitrogen);
4 to 7.2 percent by volume $CO_2$ (Carbon Dioxide);
6.7 to 15 percent by volume $H_2O$ (Water); and
5 to 11.5 percent by volume $O_2$ (Oxygen).

The exhaust gases also contained the following levels of pollutants, which were varied by modifying the combustion air temperature and the motor adjustment, of between:

2016–816 mg $HCOH/m^3$ exhaust gas
2.07–0.22 mg $HCN/m^3$ exhaust as
1950–885 vppm $NO_x$
400–130 vppm CO
525–505 vppm $CH_x$ where vppm = parts per million by volume. In addition, traces of unburned lubricants and soot were detected in the exhaust gases.

For the start-up of the installation, the reactor was heated. This takes place by means of the hot water gases and/or by an auxiliary heating unit. When the catalyst beds 4 and 5 have reached the operating temperature, ammonia can be added. Since the reaction of ammonia with the nitrogen oxides is exothermal, there is a slight temperature increase at the reactor outlet. During the reduction, per 100 vppm nitrogen oxide, there is a temperature increase of approximately 10° C.

Measurements of the exhaust gas leaving the reactor 2 gave the following reduction efficiencies:

| Exhust gas containing: | Amount Reduced |
| --- | --- |
| 50% formaldehyde (HCOH) | up to 99.9% |
| 50% hydrogen cyanide (HCN) | up to 95.0% |
| 50% nitrogen oxide(s) ($NO_x$) | up to 96.3% |
| 30% carbon monoxide (CO) | up to 68.0% |
| 10% hydrocarbons ($CH_x$) | up to 30.0% |

No deposits of soot or other materials were observed on the catalyst beds 4 and 5. This is due to the large-pore structure of the natural substances. The abrasion-resistance of the natural substances is so high that no erosion is caused by vibrations and pulsations. There was no notable effect on the life of the catalyst.

With stoichiometric, and even with slightly super-stoichiometric, dosing of the liquid or gaseous ammonia in relation to the nitrogen oxide reduction, no penetration of ammonia was observed at the reactor outlet. Even with double the dose of ammonia, the ammonia penetration remained below 10 vppm.

In the installation shown in FIG. 2, there is a heat exchanger 6 behind the reactor 2. The heat exchanger 6 extracts heat from the exhaust gas, which can be used for heating, and especially community central heating.

In the embodiment illustrated in FIG. 3, there is a heat exchanger 7 ahead of the reactor 2, in addition to the heat exchanger 6 shown in FIG. 2. This is appropriate if the exhaust gas released by the combustion facility 1 has a temperature which is above the desired operating temperature. The heat exchanger 7 can also produce heat used for heating, and preferably, community central heating. Like-numbered elements of the drawings of FIGS. 1-3 are the same.

Numerous other embodiments are within the context of the invention. It is possible, for example, to have only one catalyst bed in the reactor, and for the ammonia to be introduced into the reactor not only as a gas or a liquid, but also as ammonia in water.

The invention as described hereinabove in the context of the preferred embodiments is not to be taken as limited to all of the provided details thereof, since modifications and variations thereof may be made without departing from the spirit and scope of the invention.

What is claimed is:

1. A process for cleaning an exhaust gas produced by the combustion of a liquid or gaseous fuel from at least one of a diesel engine, an internal combustion engine and a liquefied petroleum gas burner to thereby maximize catalyst activity at a reduction temperature at which pollutants in said exhaust gas are to be reduced, said exhaust gas including a smoke gas containing particulate matter and comprising at least one oxide of nitrogen pollutant and at least one additional pollutant other than said oxide of nitrogen pollutant, said additional pollutant comprising at least a hydrocarbon, said process including the steps of:

introducing said pollutant containing exhaust gas of combustion of a liquid or gaseous fuel from said at least one of a diesel engine, an internal combustion engine and a liquefied petroleum gas burner into a reactor containing a catalyst, said catalyst including at least one naturally-occurring ore, said naturally-occurring ore being coarse and having a large pore structure, said naturally-occurring ore comprising a mixture of iron oxide in a naturally-occurring ore and a second substance containing trivalent chromium oxide ($Cr_2O_3$);

maintaining the temperature of said reactor containing said catalyst and into which said pollutant containing exhaust gas is introduced at said reduction temperature, said reduction temperature being in a range of from about 280° C. to about 365° C.;

adjusting the composition of said catalyst by adjusting the content of said trivalent chromium oxide ($Cr_2O_3$) of said catalyst to thereby maximize catalyst activity at said reduction temperature of said exhaust gas, said trivalent chromium oxide ($Cr_2O_3$) content being in a range of from about 6% to about 12% by weight of said catalyst;

said reduction temperature and the trivalent chromium oxide ($Cr_2O_3$) content of said catalyst being inversely related within said trivalent chromium oxide ($Cr_2O_3$) by weight range of from about 6% to about 12% and within said reduction temperature range of from about 280° C. to about 365° C.; and introducing ammonia into said exhaust gas for reducing said oxide of nitrogren pollutant and for additionally substantially simultaneously reducing said compound containing hydrogen and carbon in said reactor.

2. A process for cleaning an exhaust gas produced by the combustion of a liquid or gaseous fuel from at least one of a diesel engine, an internal combustion engine and a liquefied petroleum gas burner to thereby maximize catalyst activity at a reduction temperature at which pollutants in said exhaust gas are to be reduced, said exhaust gas including a smoke gas containing particulate matter and comprising at least one oxide of nitrogen pollutant and at least one additional pollutant other than said oxide of nitrogen pollutant, said additional pollutant comprising at least a hydrocarbon, said process including the steps of:

introducing said pollutant containing exhaust gas of combustion of a liquid or gaseous fuel from said at least one of a diesel engine, an internal combustion engine and a liquefied petroleum gas burner into a reactor containing a catalyst, said catalyst including at least one naturally-occurring ore, said naturally-occurring ore being coarse and having a large pore structure, said naturally-occurring ore comprising a mixture of iron oxide in a naturally-occurring ore and a second substance containing trivalent chromium oxide ($Cr_2O_3$);

maintaining the temperature of said reactor containing said catalyst and into which said pollutant containing exhaust gas is introduced at said reduction temperature, said reduction temperature being in a range of from about 280° C. to about 450° C.;

adjusting the composition of said catalyst by adjusting the content of said trivalent chromium oxide ($Cr_2O_3$) of said catalyst to thereby maximize catalyst activity at said reduction temperature of said exhaust gas, said trivalent chromium oxide ($Cr_2O_3$) content being in a range of from about 0.03% to about 12% by weight of said catalyst;

said reduction temperature and the trivalent chromium oxide ($Cr_2O_3$) content of said catalyst being inversely related within said trivalent chromium oxide ($Cr_2O_3$) by weight of from about 0.03% to about 12% and within said reducton temperature range of about 280° C. to about 450° C.; and introducing ammonia into said exhaust gas for reducing said oxide of nitrogen pollutant and for additionally substantially simultaneously reducing said compound containing hydrogen and carbon in said reactor.

3. A process for treating an exhaust gas produced by at least one of a diesel engine, an internal combustion engine and a liquified petroleum gas burner, said exhaust gas comprising a smokey gas, an oxide of nitrogen pollutant and at least one additional pollutant, said additional pollutant comprising a hydrocarbon, said process comprising the steps of:

providing a reaction zone;

providing, within said reaction zone, a catalyst comprising at least one naturally-occurring ore including iron oxide and including trivalent chromium oxide ($Cr_2O_3$), said naturally-occurring ore being coarse and having a large pore structure;

maintaining said reaction zone at a reaction temperature within a reaction temperature range of between about 280° C. to about 450° C.;

introducing said exhaust gas into said reaction zone;

introducing ammonia into said reaction zone; and adjusting the trivalent chromium oxide ($Cr_2O_3$) content of said catalyst within a range of from about 0.03% to about 12% by weight to thereby maximize the activity of said catalyst at said maintained reaction temperature within said reaction temperature range of from about 280° C. to about 450° C.;

said trivalent chromium oxide ($Cr_2O_3$) content by weight of said catalyst and said reaction temperature being inversely related to one another within said ranges.

* * * * *